United States Patent [19]
Grant

[11] Patent Number: 5,931,321
[45] Date of Patent: Aug. 3, 1999

[54] CRANE MECHANISM

[76] Inventor: Robert K. Grant, Rte. 3, Box 340 A, Mullins, S.C. 29574

[21] Appl. No.: 09/052,517

[22] Filed: Mar. 31, 1998

[51] Int. Cl.$^6$ .................................................. B66C 23/06
[52] U.S. Cl. ........................... 212/233; 212/231; 414/563
[58] Field of Search ..................... 414/543, 563; 212/233, 258, 231, 232, 299, 300

[56] References Cited

U.S. PATENT DOCUMENTS

| | | | |
|---|---|---|---|
| 800,166 | 9/1905 | Morgan | 414/543 |
| 1,237,573 | 8/1917 | Stogsdill . | |
| 1,359,379 | 11/1920 | Holmes | 212/233 |
| 2,537,755 | 1/1951 | Harbaugh | 414/563 |
| 2,726,066 | 12/1955 | Lear et al. . | |
| 3,468,439 | 9/1969 | Olitsky et al. | 212/258 |
| 3,684,104 | 8/1972 | Oda et al. . | |
| 3,685,673 | 8/1972 | Schweis | 414/543 |
| 4,519,741 | 5/1985 | Testore | 212/233 |
| 4,993,911 | 2/1991 | Grant . | |

*Primary Examiner*—Thomas J. Brahan
*Attorney, Agent, or Firm*—Dority & Manning, P.A.

[57] ABSTRACT

A crane structure for hoisting, holding and/or towing heavy loads is provided. The crane structure includes a frame, for example a wrecker truck chassis, a boom support assembly, and a pair of booms each having a first member pivotally mounted to the boom support assembly so that the first boom and the second boom are pivotal in parallel vertical planes. Each of the first boom and the second boom also has a fluid operable second member slidably received by the first member. A control system is in operative communication with the first boom, the second boom and a winch assembly to independently activate each second member to extend from and retract to its corresponding first member, to pivotally position each boom with respect to the frame, and to activate the winch assembly to retract and extend cables about free ends of the respective second members.

21 Claims, 12 Drawing Sheets

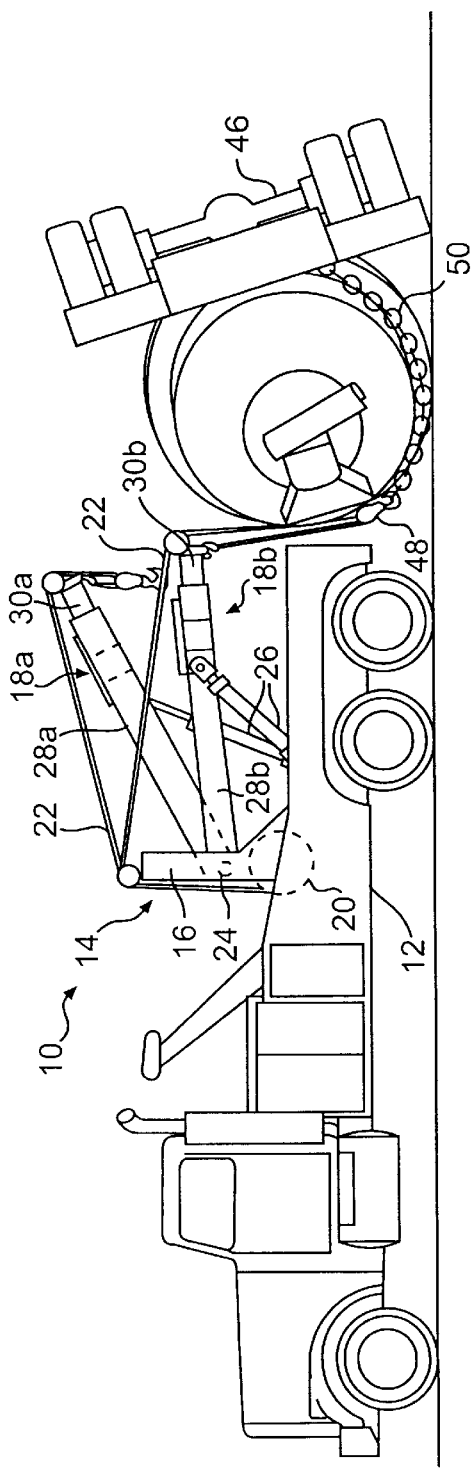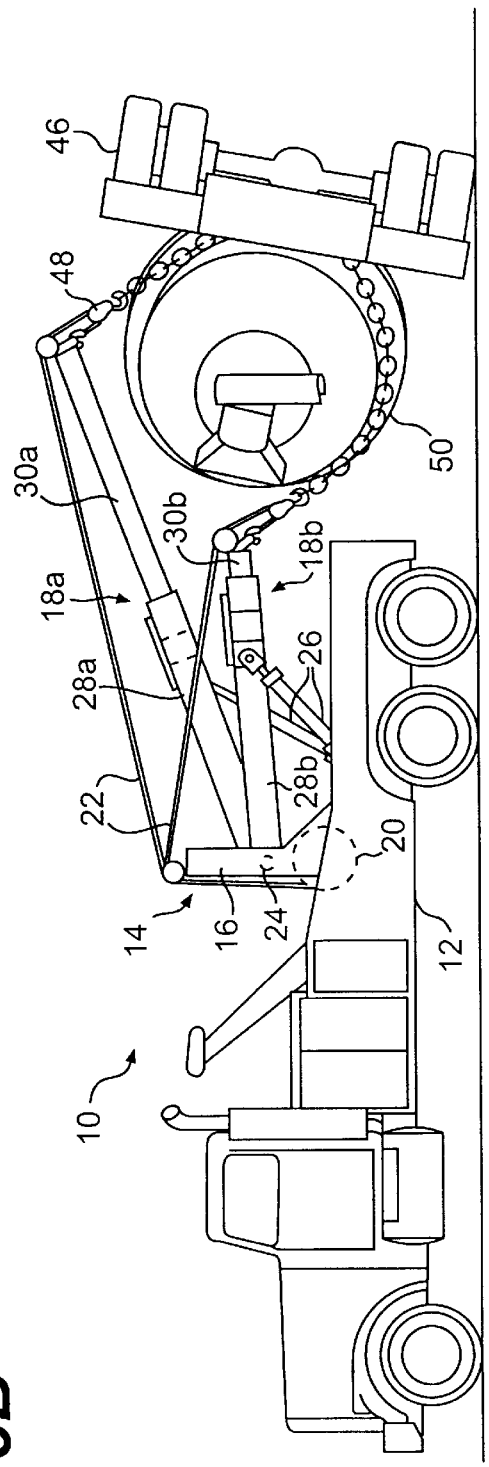
FIG. 3B
FIG. 3C

CRANE MECHANISM

BACKGROUND OF THE INVENTION

The present invention relates to crane mechanisms and, more particularly, to crane mechanisms adapted for use on tow trucks and other similar vehicles and structures.

Mobile cranes associated with wrecker trucks for towing other vehicles, for example which are utilized for lifting and transporting heavy loads from inaccessible places, have generally employed mechanical winches in conjunction with a boom for lifting and positioning a load. The maximum safe load limit for these mechanical arrangement is generally determined by, for example, the mass of the material used in the mechanical devices, cable diameters, thicknesses of structural steel for the boom and supports therefor, sizes of bolts and pivots, etc. A mobile crane using a hydraulic actuated boom is disclosed in U.S. Pat. No. 4,993,911, the entire disclosure which in incorporated by reference herein.

Generally, crane designs of the prior art utilize a single boom and winch arrangement for lifting or towing a heavy load. Thus, a load is secured either by a hook or other attachment mechanism at one point on the load, or by a chain or other attachment mechanism wrapped around the load and secured to the boom's one or more cables. Thus, the entire load is lifted from an end of one boom.

Such an arrangement makes manipulation of the load difficult. For example, it is difficult for a wrecker having a single boom configuration to lift and upright an overturned truck or rail car in a controlled manner. While mechanical wreckers are known having double booms, these are generally unsuitable for lifting and manipulating heavy loads. Typically, the booms were configured to swivel from side to side and were raised and lowered by mechanical means, for example by hand cranks.

SUMMARY OF THE INVENTION

The present invention recognizes and addresses the foregoing disadvantages, and others, of prior art construction and methods.

Accordingly, it is an object of the present invention to provide an improved crane structure having at least two independently operable hydraulic booms.

It is a further object of the present invention to provide an improved crane structure having two independently operable hydraulic booms capable of securing a heavy load from different positions so that the load may be effectively controlled during hoisting and/or towing.

Some of these objects are achieved by a crane structure for hoisting, holding and/or towing heavy loads. The crane structure comprises a frame, a boom support assembly, a first boom, a second boom, a winch assembly and a control system. The boom support assembly is mounted to the frame. The first boom and the second boom each have a first member pivotally mounted to the boom support assembly so that the first boom and the second boom are pivotal in parallel vertical planes. The first boom and the second boom each has a fluid operable second member slidably received by the first member. The winch assembly includes a base assembly and a pair of cables. Each cable of the pair of cables extends from the base assembly about free ends of respective second members. Each cable has a securing mechanism at a free end thereof opposite the base assembly for securing a load. The control system is in operative communication with the first boom, the second boom and the winch assembly. The control system is configured to independently activate each second member to retract to and extend from its corresponding first member, to pivotally position each of the first boom and the second boom with respect to the frame, and to activate the winch assembly to retract and extend the cables about the free ends of their respective second members.

In one preferred embodiment, the crane structure is a wrecker truck having a chassis upon which the boom support assembly is mounted. The booms may be configured in various preferred arrangements. For example, the first and second booms may have a common outer sleeve slidably receiving the second members so that they are fixed in a side by side parallel relation. The second members may, however, be independently extended from and retracted to the common sleeve. In another preferred embodiment, the booms are fixed in a parallel relationship one above the other. This configuration is particularly advantages for situations in which there is not enough room to accommodate side by side booms to secure a load. In still another embodiment, the booms are separate structures independently movable within parallel vertical planes.

The configuration of the present invention provides several advantages in hoisting and/or towing heavy objects. For example, one boom may be extended to the far side of the load while the first boom remains at the near side. The crane or wrecker truck is therefore able to lift the load from two positions on either side of the load, thereby providing more stable control in hoisting and/or towing. Furthermore, the cables may be independently actuated to more precisely control the positioning of a load, for example an overturned rail car, during or after hoisting.

The accompanying drawings, which are incorporated and constitute part of the specification, illustrate one or more preferred embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 3B is a side view of the crane structure as in FIG. 3A partially securing a load;

FIG. 3C is a side view of the mobile crane as in FIG. 3A manipulating a load

Figure 1:
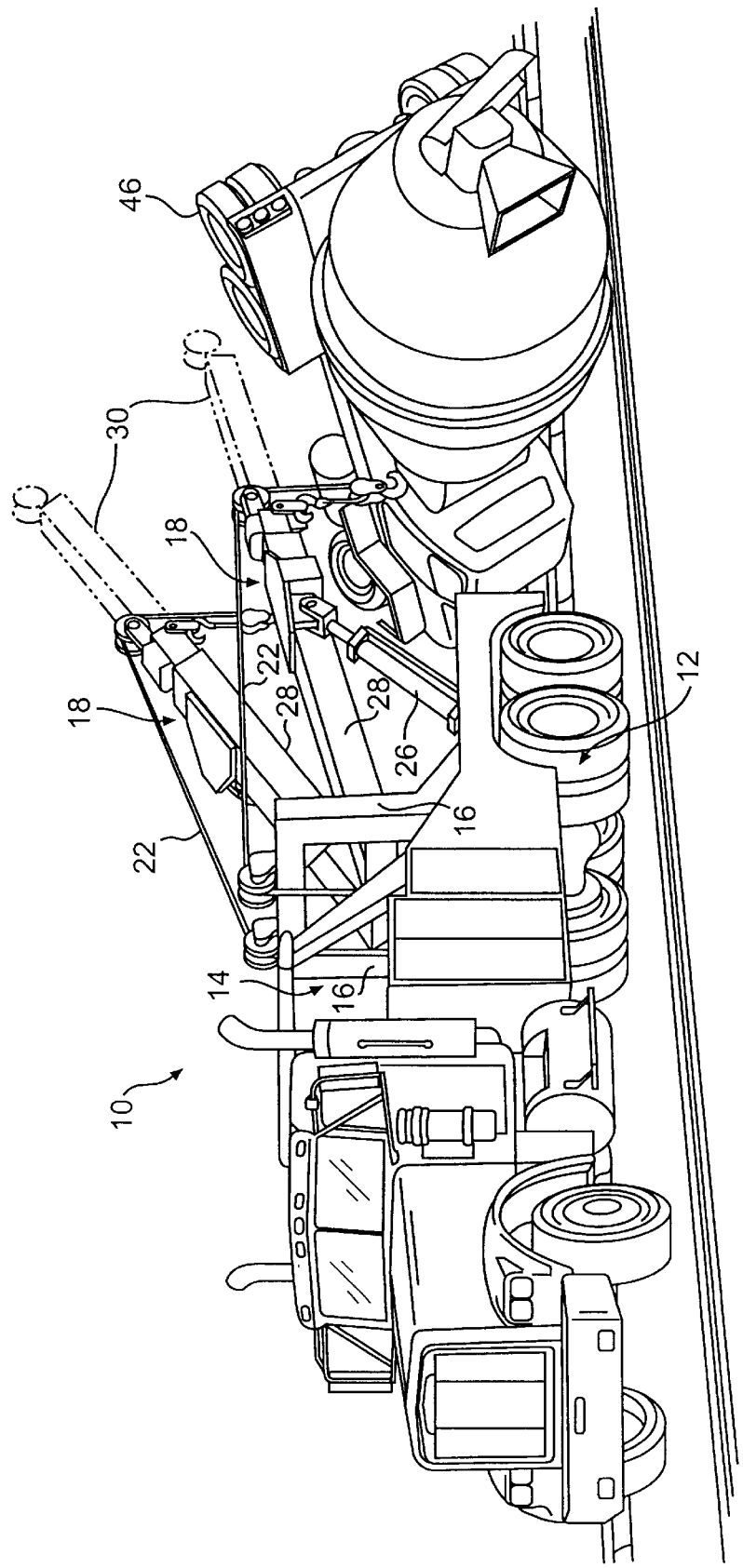
FIG. 1 is a perspective view of a crane structure in accordance with the present invention.

Repeat use of reference characters in the present specification and drawings is intended to represent same or analogus features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may used on another embodiment to yield a still further embodiment. Thus, it is intended that the present invention covers such modifications and variations as come within the scope of the appended claims and their equivalents.

As shown in FIGS. 1, 3A–3D, 5A–5D and 6, a crane structure in accordance with the present invention is indicated generally by the reference numeral 10. In the preferred embodiments illustrated in the figures, the crane structure is a wrecker truck. It should be understood, however, that other suitable crane structures, for example a gantry, may be employed.

Wrecker truck 10 includes a chassis, indicated generally at 12, upon which is mounted a boom support structure 14. Boom support structure 14 comprises a mast structure preferrably including two upwardly projecting members 16.

Although a high profile mast structure is illustrated in the Figures, it should be understood that a low profile structure, or other suitable boom support structure, may be used. Boom support assembly 14 supports first and second booms 18 and a winch assembly including a winch base assembly 20 (FIGS. 3A–3D, 5A–5D, 6) and cables 22. The winch assembly also includes gear boxes, motor drives and other components that should be understood by those of ordinary skill in this art. An exemplary arrangment and operation of a winch asembly which may be used with the present invention is provided in U.S. Pat. No. 4,993,911 referenced above. In the embodiments illustrated in the figures the winching mechanism is used solely to secure, hoist and manipulate loads. It should be understood, however, that a winch/cable assembly may also be used to raise and lower booms 18, for example in a gantry configuration.

Figure 2:
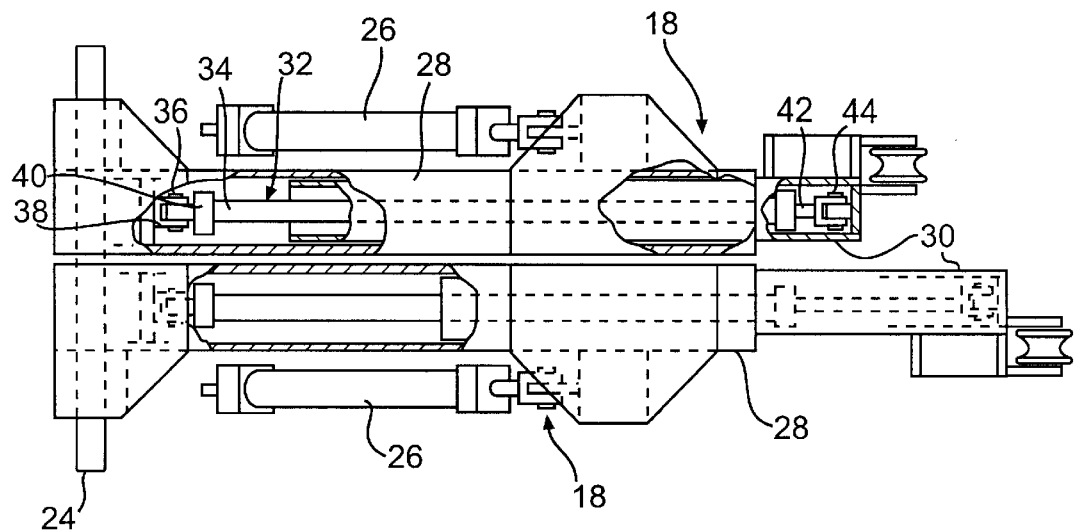
FIG. 2 is a top view of two side by side independently elevatable booms constructed in accordance with the present invention.

In the wrecker configuration illustrated in the figures, booms 18 are pivotally mounted to boom assembly 14 by a pivot pin 24 (FIGS. 2–7C) and are moved through their angular ranges of motion in parallel vertical planes by hydraulic elevation rams 26 secured at one end to chassis 12 and at the other end to boom 18. Although one elevation ram 26 is illustrated in FIG. 1 and 2, it should be understood that two rams per boom may be utilized. A description of the operation of an exemplary elevation ram, as well as an exemplary elevation ram/boom support structure and chassis arrangement, is provided in U.S. Pat. No. 4,993,911 referenced above.

Booms 18 include a first member 28 pivotally mounted to mast members 16 and a fluid operable second member 30 slidably received by first member 28. Extension and retraction of second member 30 relative to first member 28 as shown in FIG. 2 is provided by a hydraulic ram 32 mounted within boom 18. Ram 32 has a cylinder 34 secured by a pivot pin 36 extending through a yoke 38 secured to the head section 40 of the ram. Operable within the cylinder 34 is a piston (not shown) and a piston rod 42. Piston rod 42 is attached to the outer end of second member 30 by a pin 44. The operation of a ram such as ram 32 within a boom is described in U.S. Pat. No. 4,993,911 referenced above. The operation and structure of the ram 32 is identical for each boom 18. It should be understood, however, that various suitable hydraulic configurations, for example which may include pneumatic configurations, are possible within the scope and spirit of the present invention.

Figure 3A:
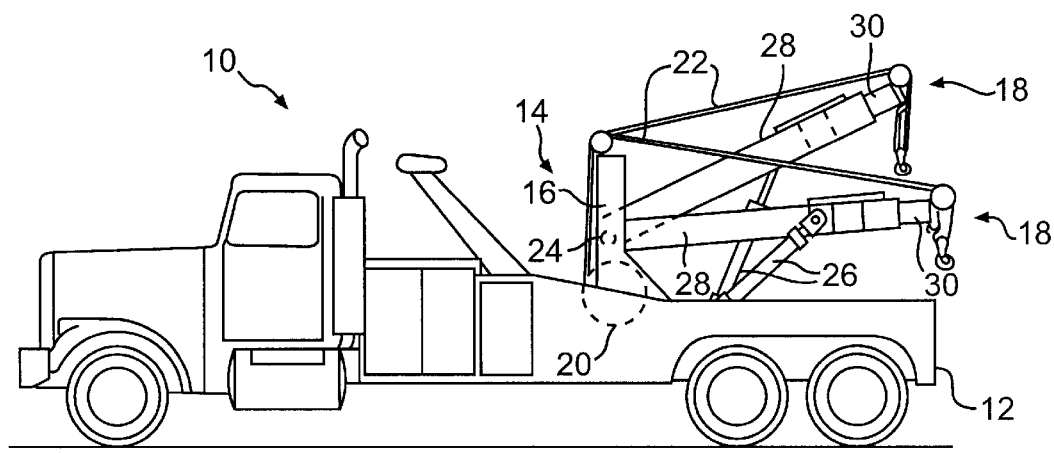
FIG. 3A is a side view of a mobile crane including a boom structure as in FIG. 2.
Figure 3D:
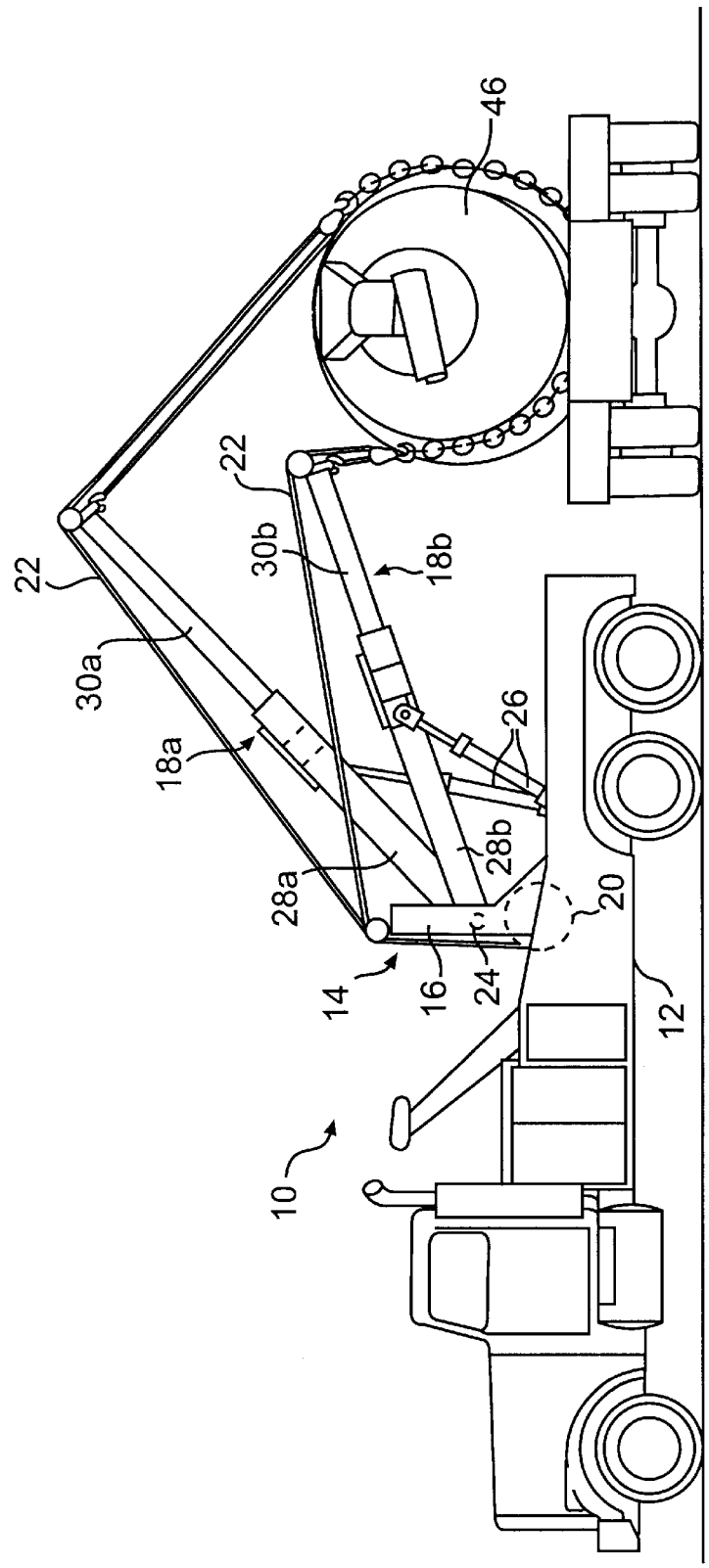
FIG. 3D is a side view of the mobile crane as in FIG. 3A bringing a load to an upright position.

In the embodiments illustrated in FIGS. 1–3D, booms 18 are independently pivotal in separate parallel vertical planes. Thus, they may be raised and lowered independently of each other, and their second members 30 may be independently extended and retracted to secure, hoist and/or manipulate a load such as an overturned truck 46. Referring to FIGS. 3B–3D, the two booms 18a and 18b may be used to hoist, tow or manipulate overturned truck 46. Referring to FIG. 3B, a hook 48, or other suitable securing device attached to cable 22 of boom 18b, may be secured to truck 46 directly or by means such as chain 50. As shown in FIG. 3C, second member 30a of boom 28a may then be extended to the oppposite side of truck 46 so that the boom's hook 48 may be attached to the other end of chain 50. Cables 22 of booms 18a and 18b may then be selectively retracted and/or extended to lift truck 46 from its overturned position as shown in FIG. 3B to an upright position as shown in FIG. 3D. Selective manipulation of the cables and position of the booms permits relatively precise control of truck 46 as it is being moved.

Figure 4:
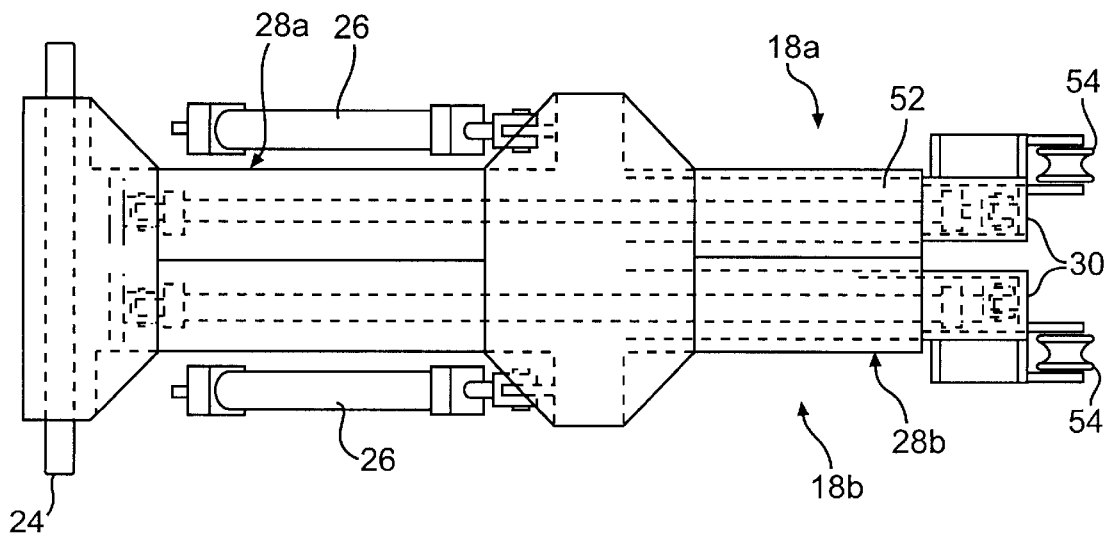
FIG. 4 is a top view of two side by side booms having a unitary sleeve maintaining the booms in a parallel position.

Referring to FIG. 4, it may be advantageous in some circumstance to maintain booms 18a and 18b parallel to each other. Accordingly, first members 28a and 28b are attached, either by a unitary construction or other attachment means. Thus, while second members 30 may be indepently extended and retracted, they will always remain parallel. Such construction may provide, for example, increased stability to the wrecker for particularly heavy and/or unstable loads. As shown in FIG. 4, first section 28a of first boom 18a and first section 28b of second boom 18b are part of a unitary sleeve 52.

Figure 5A:
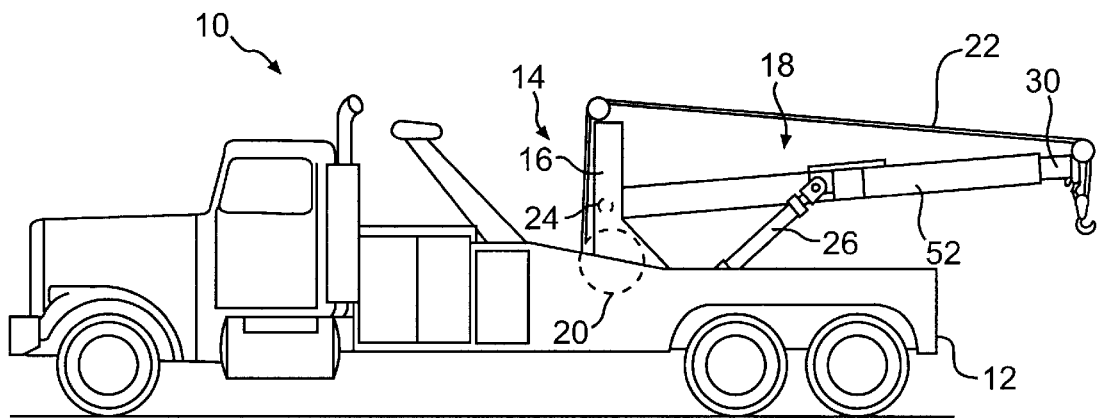
FIG. 5A is a side view of a mobile crane having a boom structure as in FIG. 4.
Figure 5B:
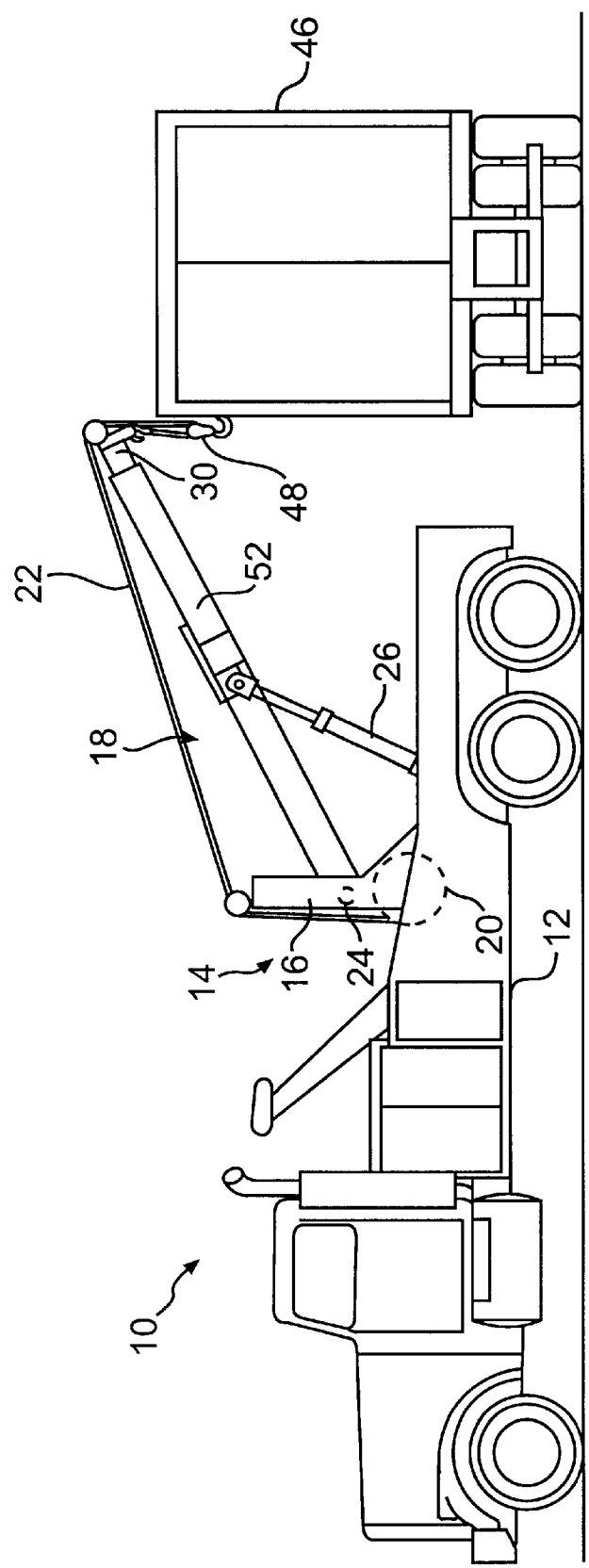
FIG. 5B is a side view of a mobile crane as in FIG. 5A adjacent a load to be hoisted.
Figure 5C:
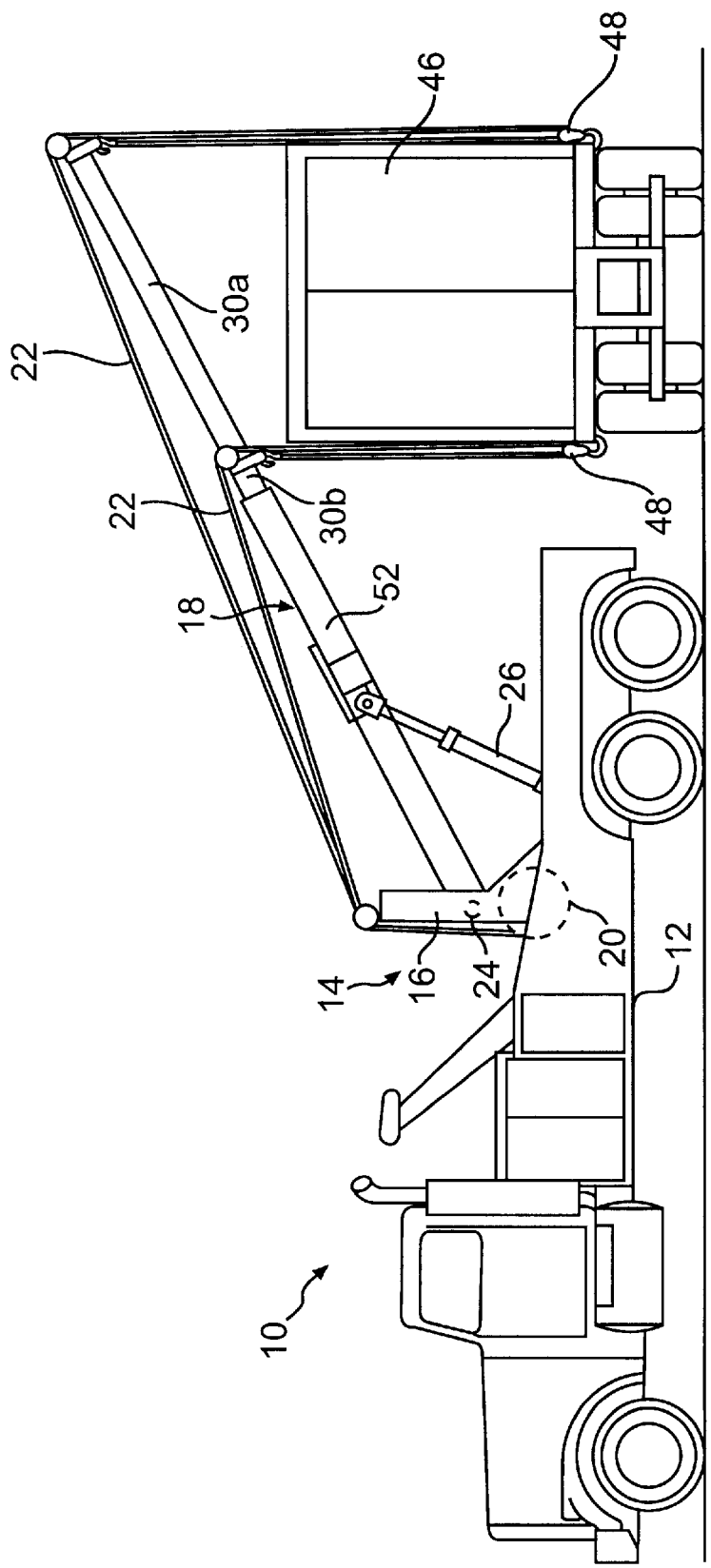
FIG. 5C is a side view of a mobile crane as in FIG. 5A securing a load.
Figure 5D:
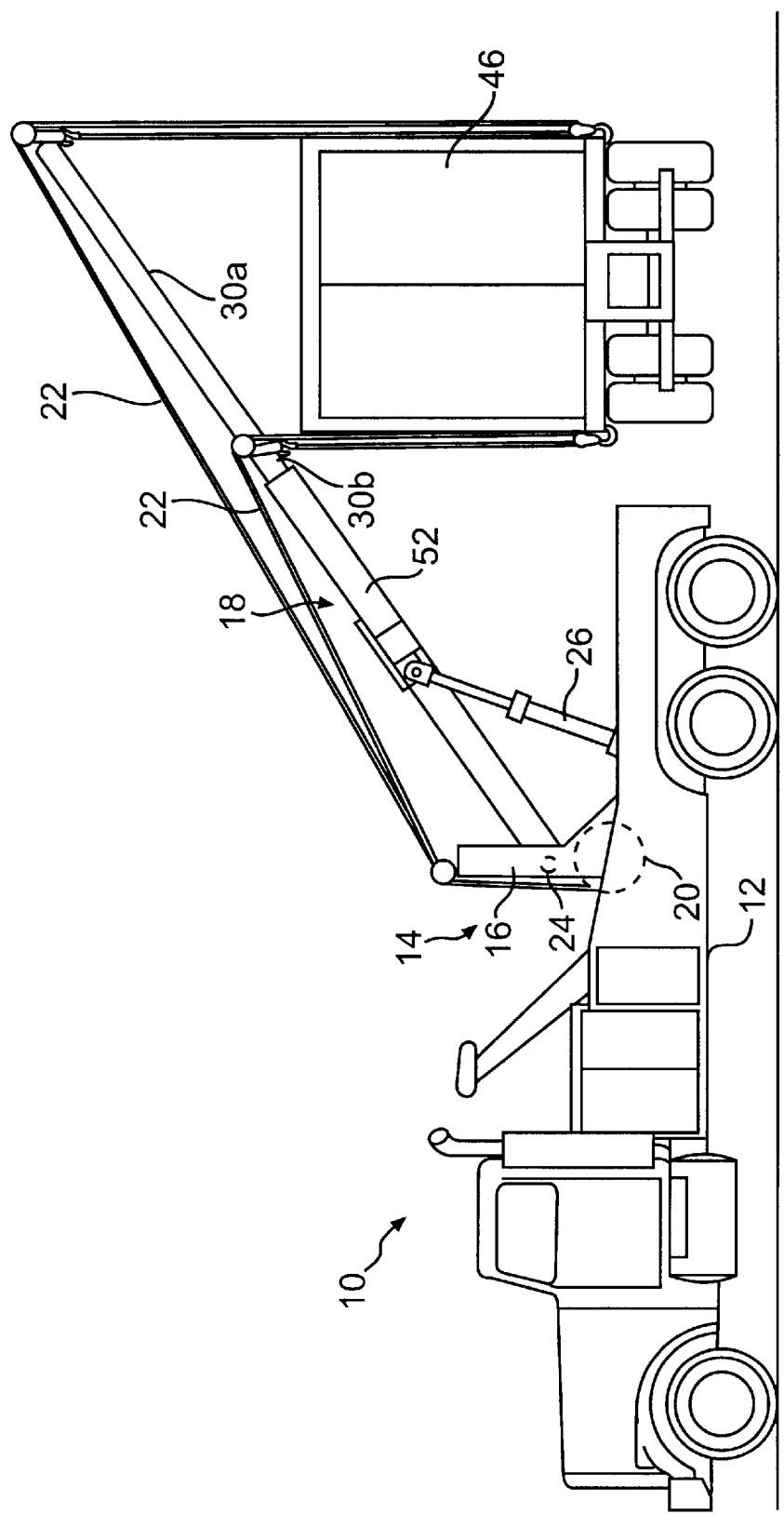
FIG. 5D is a side view of the mobile crane as in FIG. 5A hoisting a load.

As illustrated in FIGS. 5A–5D, the boom configuration as shown in FIG. 4 on a wrecker 10 may be used to lift, tow and/or manipulate a load such as truck 46. As shown in FIG. 5B, booms 18 may be brought to an appropriate position proximate truck 46 after which one of the second members, for example second member 30a as shown in FIG. 5C, may be extended to the opposite side of the truck. Cables 22 are then deployed so that hooks 48, or other suitable securing devices, may be secured to the truck. The truck may then be lifted by retracting cables 22 and/or lifting booms 18, as shown in FIG. 5D.

Figure 6:
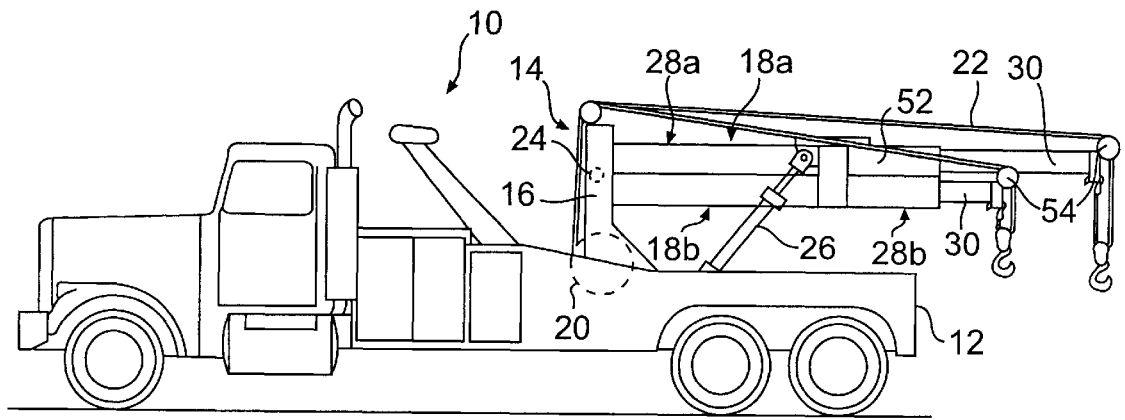
FIG. 6 is a side view of a mobile crane having two booms maintained in an over-and-under parallel position by unitary sleeve.
Figure 7A:
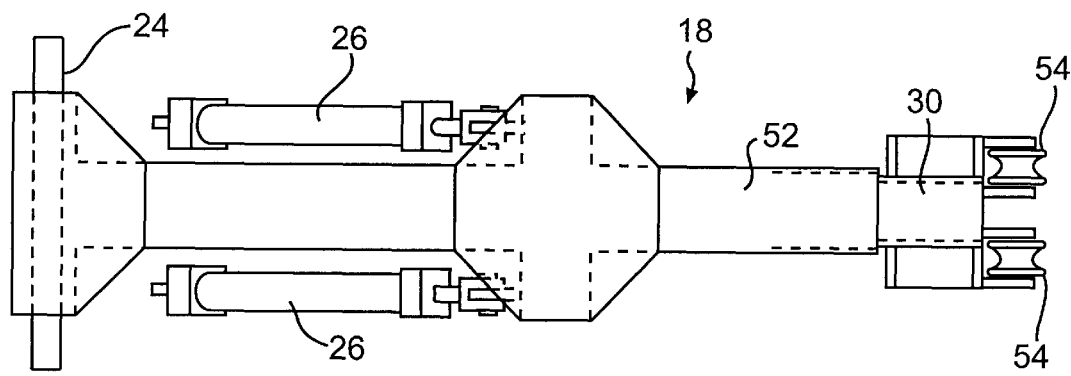
FIG. 7A is a top view of the boom pair as in FIG. 6.
Figure 7B:
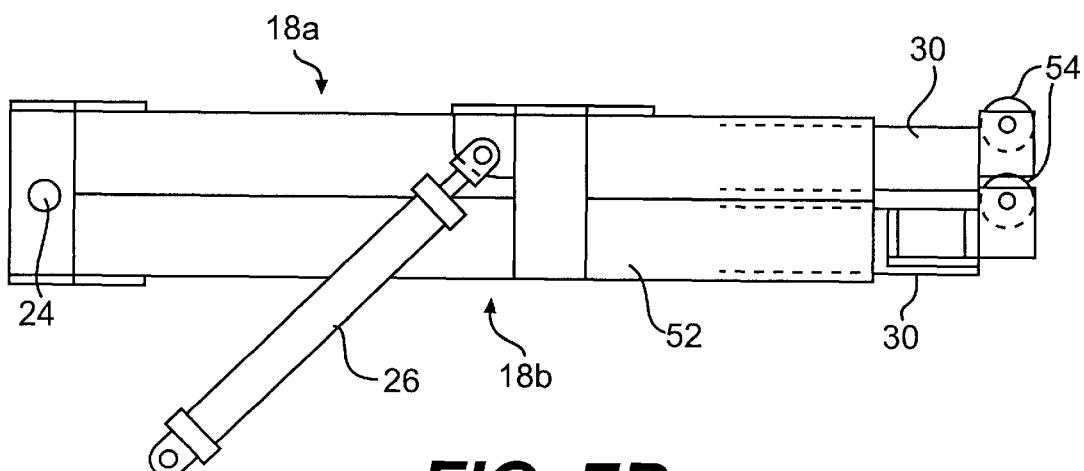
FIG. 7B is a side view of the boom pair as in FIG. 6.
Figure 7C:
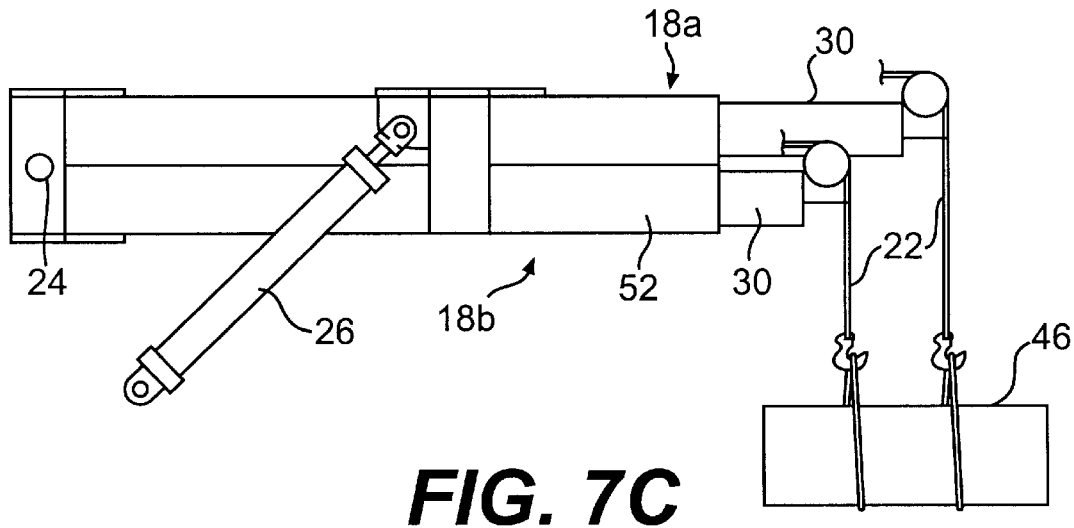
FIG. 7C is a side view of the boom pair as in FIG. 6 securing a load.
Figure 7D:
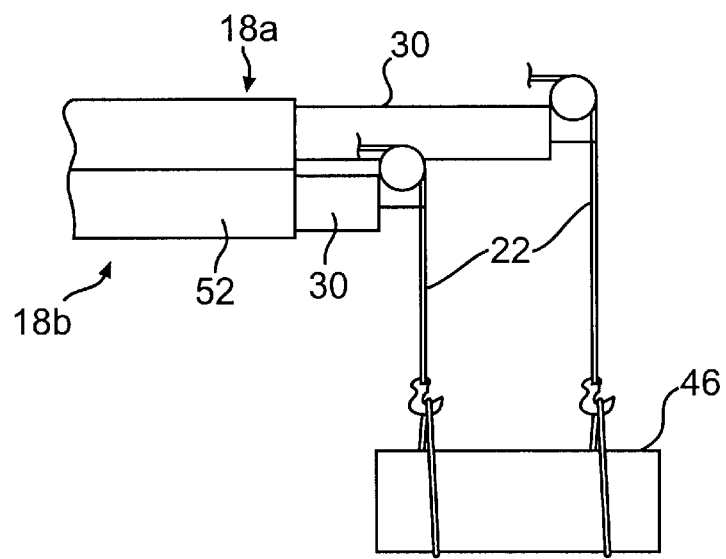
FIG. 7D is a partial side view of the boom pair as in FIG. 6 securing a load.

As illustrated in FIGS. 6–7D, booms 18 may also be constructed in an over-and-under configuration where first secion 28a of first boom 18a and first section 28a of second boom 18b are attached, for example by a unitary sleeve 52. In this configuration, the vertical planes in which the booms move coincide.

As illustrated in the figures, the winch assembly may include pulleys mounted on the boom support assembly and on the ends of the booms to accomodate cables 22. In the over-and-under configuration, the pulleys 54 at the outer ends of the booms 18 do not interfere with each other, even though the pulley on the lower boom extends above the horizontal plane seperating the booms, since the pulleys are disposed on opposite sides of their respective second boom portions 30, as shown in FIG. 7A.

The over-and-under configuration may be advantageous where it is necessary to secure a load in a particular aligned position, as illustrated in FIGS. 7C and 7D, or where space is limited so that side-by-side booms are unable to be brought into position to secure a load 46.

The crane structure of the present invention is particularly useful to secure large loads such as overturned tractor trailer rigs or rail cars. Thus, wrecker trucks, for example those known as the Holmes 600, 750 or 850, may be used with various suitable crane or mast configurations. The construction and dimensions of the booms themselves may depend, for example, upon the materials used and the loads the booms are expected to secure. For example, steel boom dimensions could be affected by the quality of the steel and by the geometry of the tubing. Of course, particular dimensions and truck configurations may depend on specific circumstances.

Wrecker truck 10 includes a control system to control the raising and lowering of booms 18, the extending and retracting of second members 30, and the operation of the winch assembly. In order to retract the piston 42 (FIG. 2) and thereby retract the boom member 30, fluid under pressure within the cylinder 34 is exhausted by means of a control valve arrangment. As shown in the hydraulic circuitry of FIG. 8A, which corresponds to the independently pivotal boom configuration illustrated in FIGS. 1–3D, the heads 40 for rams 26 are connected by pressure-inducing tubing 58 to a valve bank 62. Similarly, the return ports of the cylinders are connected to the valve bank by pressure-inducing tubing 58. Cylinders 32 are also connected by tubes 58 to the valve bank 62.

Fluid under pressure is conveyed from a hydraulic pump 64 by way of a tube 66 to the valve bank 62 while fluid is conveyed from the valve bank by way of a return tube 68 to a reservoir 70 for the hydraulic system. Any suitable means may be utilized to operate the hydraulic pump 64, and the more conventional arrangement utilizes a power take-off device 72 mechanically connected to the transmission 74 for the wrecker truck 10.

Figure 8A:
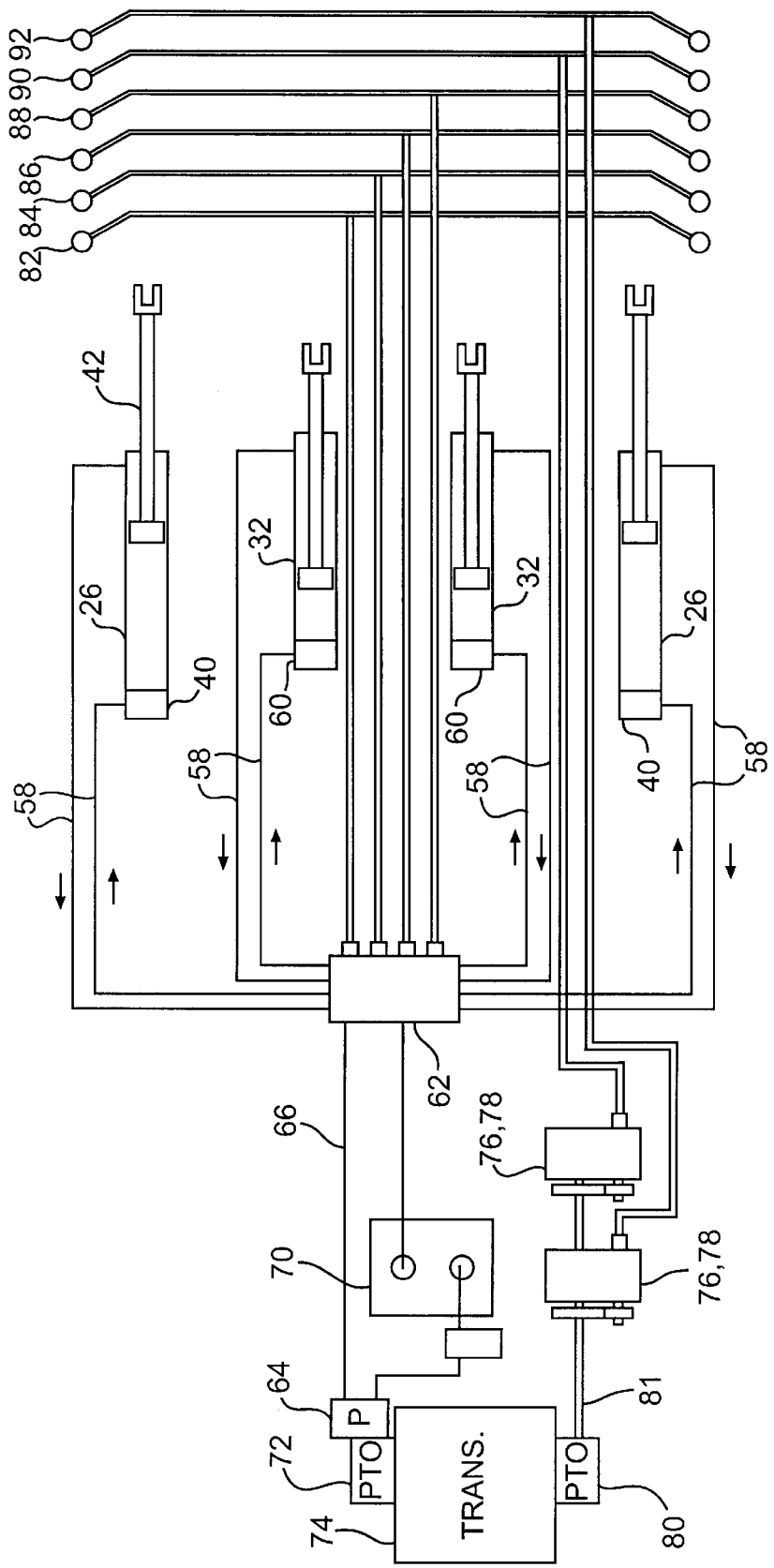
FIG. 8A is a schematic view of a hydraulic control system utilized in accordance with the present invention.
Figure 8B:
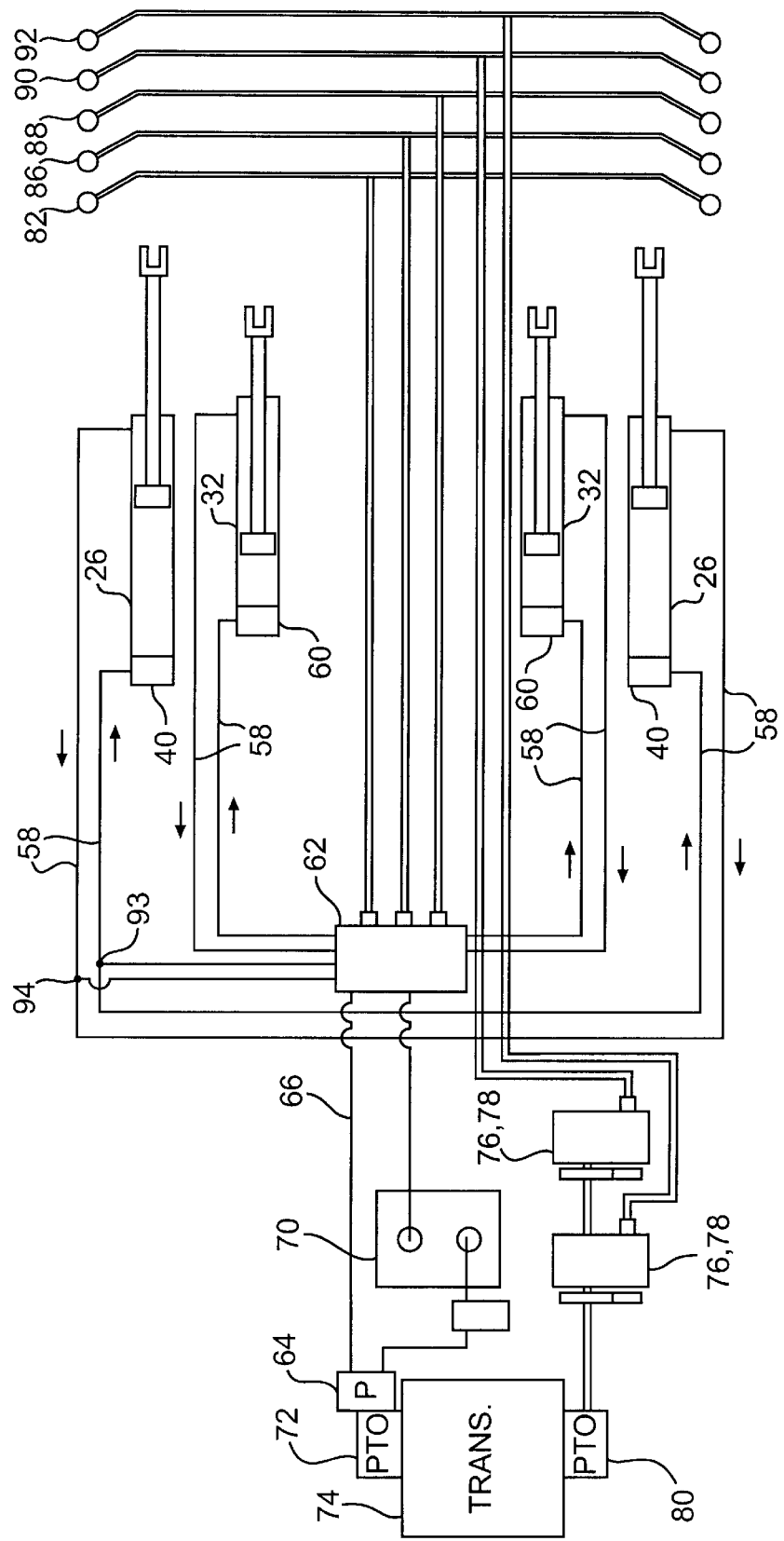
FIG. 8B is a schematic view of a hydraulic control system utilized in accordance with the present invention.

The same transmission may also be uitilized to operate the winch assembly, which may be operated mechanically, electrically, or hydraulically (which should be understood to include pneumatic operation). A mechanical arrangement is illustrated in FIGS. 8A and 8B. The winch assembly includes two winches 76 with associated gear boxes 78. Each winch 76 is associated with a respective boom to raise and lower a cable 22. A power take-off device 80 drives a shaft 81 which in turn drives the winches 76 by gear boxes 78. In a hydraulic configuration, the cable winches may be driven through valve bank 62 from pump 64. Alternatively, a separate power take-off device may be provided to drive a separate pump for operating the winches.

Operation of the boom lift rams 32 and the elevator rams 26 is controlled by an operator utilizing pairs of handles 82, 84, 86 and 88 which serve to manipulate the valve elements within valve bank 62. The valve handles are operatively connected to the valve bank electrically, mechanically or hydraulically to operate the same for introducing fluid under pressure to the cylinders 26 and 32 for independently lifting booms 18 and for independently extending and retracting second members 30 from and to their respective first members 28. Handles 90 and 92 are operatively connected to respective gear boxes 78 to operate winches 76. If the winches are hydraulic, these handles may be connected to a valve box such as valve box 62.

A hydraulic control system for either a side-by-side construction, for example as illustrated in FIGS. 4–5D, or an over-and-under configuration, for example as illustrated in FIGS. 6–7D, is illustrated in FIG. 8B. The control system is similar to that illustrated in FIG. 8A except that elevation rams 26 are simultaneously operated by a single handle 82. Specifically, the heads and return ports of elevation rams 26 are jointly connected to valve bank 62 by pressure-inducing tubing 58 and tees 93 and 94. Thus, operation of handle 82 operates both elevation rams 26 at the same time.

In normal operation of the wrecker truck 10 in the various configurations described above, an operator may manipulate the controls 82–88 from either side of the truck to extend the booms, and to appropriately angularly postion them, so that the hooks 48 may be properly secured to the load. Since the operation of the elevation rams is independent of the operation of the second boom members, these manipulations may be made sequentialy or concurrently, as determined by the characteristics of the load and by the skill of the operator. After applying the hooks to the load, the operator may manipulate the ram and winch assembly controls to raise and/or lower respective booms and cables, as appropriate to the load, its configuration and other circumstances, to ensure that the booms are properly positioned and extended, and that the cables are properly operated, so that the load is properly handled.

It will be understood that while the forms of the invention herein shown and described constitute preferred embodiments of the invention, it is not intended to illustrated all possible forms of the invention. It will also be understood that the words used are words of description rather than of limitation and that various changes may be made without departing from the spirit and scope of the invention herein disclosed.

What is claimed:

1. A crane truck for hoisting, holding and/or towing heavy loads, said crane truck comprising:

a mobile chassis;

a boom support assembly mounted to said chassis;

a first boom and a second boom, each said boom being extendable rearward from said chassis and having a first section pivotally mounted to said boom support assembly so that said first boom and said second boom are pivotal in parallel vertical planes, each of said first boom and said second boom also having a fluid operable second section slidably received by said first section;

a winch assembly including a base assembly and a pair of cables, each cable of said pair of cables extending from said base assembly about free ends of respective said second sections, each said cable having a securing mechanism at a free end thereof opposite said base assembly for securing a load; and a control system in operative communication with said first boom, said second boom and said winch assembly, said control system configured to independently activate each said second section to extend from and retract to its corresponding said first section, to pivotally position each of said first boom and said second boom with respect to said chassis, and to activate said winch assembly to retract and extend said cables about said free ends of said respective second sections, to thereby manipulate a single load with both said booms.

2. The crane truck as in claim 1, wherein said first boom and said second boom are independently pivotable in their respective said parallel vertical planes.

3. The crane truck as in claim 1, wherein said first section of said first boom and said first section of said second boom are attached in parallel to each other on opposite sides of a substantially vertical plane so that said first boom and said second boom are maintained parallel to each other.

4. The crane truck as in claim 1, wherein said first section of said first boom is attached parallel to and above said first section of said second boom so that said first boom and said second boom are maintained parallel to each other.

5. A wrecker truck for hoisting, holding and/or towing heavy loads, said hoisting structure comprising:

a wheeled chassis;

a boom support assembly mounted to said chassis;

a first boom and a second boom, each said boom extending rearward from said boom support assembly with respect to said chassis and having a first section pivotally mounted to said boom support assembly so that said first boom and said second boom are maintained in and pivotal in parallel vertical planes, each of said first boom and said second boom also having a fluid operable second section slidably received by said first member;

a winch assembly including a base assembly and a pair of cables, each cable of said pair of cables extending from said base assembly about free ends of respective said second sections, each said cable having a securing mechanism at a free end thereof opposite said base assembly for securing a load; and a control system in operative communication with said first boom, said second boom and said winch assembly, said control system configured to independently activate each said second section to extend from and retract to its corresponding said first section, to pivotally position each of said first boom and said second boom with respect to said chassis, and to activate said winch assembly to retract and extend said cables about said free ends of said respective second sections, to thereby manipulate a single load with both said booms.

6. The wrecker truck as in claim 5, wherein said first boom and said second boom are configured to pivot separately in their respective said parallel vertical planes.

7. The wrecker truck as in claim 5, wherein said first section of said first boom and said first section of said second boom are attached in parallel to each other on opposite sides of a substantially vertical plane to maintain said first boom and said second boom parallel to each other.

8. The wrecker truck as in claim 5, wherein said first section of said first boom is attached parallel to and above said first section of said second boom to maintain said first boom and said second boom parallel to each other.

9. The wrecker truck as in claim 5, wherein each said second section has one or more pulleys positioned at its outer end for operative cooperation with one or more said cables.

10. The wrecker truck as in claim 9, wherein each of said first boom and said second boom includes a fluid-operable, cylinder/piston extension ram arranged within said boom, said extension ram having one end connected to the interior of said first section and another end connected to the interior of said second section whereby activation of said ram produces outward extension of said second section and, therefore, said one or more pulleys relative to the boom support mechanism.

11. The wrecker truck as in claim 5, wherein said base assembly includes a mast structure.

12. The wrecker truck as in claim 5, including at least one fluid-operable, cylinder/piston elevation ram operatively associated with each of said first boom and said second boom, each said elevation ram having an end connected adjacent the outer end of said first section and another end secured to said chassis, wherein each said elevation ram, when activated, is configured to pivot its respective said boom within a range of orientations between minimum and maximum angular positions.

13. A wrecker truck for hoisting, holding and/or towing heavy loads, said hoisting structure comprising:

a chassis;

a boom support assembly mounted to said chassis;

a first boom and a second boom each having a first section pivotally mounted to said boom support assembly so that said first boom and said second boom are pivotal in parallel vertical planes, each of said first boom and said second boom also having a fluid operable second section slidably received by said first section;

a winch assembly including a base assembly and a pair of cables, each cable of said pair of cables extending from said base assembly about free ends of respective said second sections, each said cable having a securing mechanism at a free end thereof opposite said base assembly for securing a load; and a control system in operative communication with said first boom, said second boom and said winch assembly, said control system configured to independently activate each said second section to extend from and retract to its corresponding said first section, to pivotally position each of said first boom and said second boom with respect to said chassis, and to activate said winch assembly to retract and extend said cables about said free ends of said respective second sections, wherein said first section of said first boom and said first section of said second boom are attached in parallel to each other on opposite sides of a substantially vertical plane by a unitary sleeve including said first section of said first boom and said first section of said second boom to maintain said first boom and said second boom parallel to each other.

14. A wrecker truck for hoisting, holding and/or towing heavy loads, said hoisting structure comprising:

a chassis;

a boom support assembly mounted to said chassis;

a first boom and a second boom each having a first section pivotally mounted to said boom support assembly so that said first boom and said second boom are pivotal in parallel vertical planes, each of said first boom and said second boom also having a fluid operable second section slidably received by said first section;

a winch assembly including a base assembly and a pair of cables, each cable of said pair of cables extending from said base assembly about free ends of respective said second sections, each said cable having a securing mechanism at a free end thereof opposite said base assembly for securing a load; and a control system in operative communication with said first boom, said second boom and said winch assembly, said control system configured to independently activate each said second section to extend from and retract to its corresponding said first section, to pivotally position each of said first boom and said second boom with respect to said chassis, and to activate said winch assembly to retract and extend said cables about said free ends of said respective second sections, wherein said first section of said first boom is attached parallel to and above said first section of said second boom by a unitary sleeve including said first section of said first boom and said first section of said second boom to maintain said first boom and said second boom parallel to each other.

15. A crane truck for hoisting, holding and/or towing heavy loads, said crane truck comprising:

a mobile chassis;

a boom support assembly mounted to said chassis;

a first boom and a second boom having respective first sections pivotally mounted to said boom support assembly by a common mount so that said first boom and said second boom are pivotal in parallel vertical planes, each of said first boom and said second boom also having a fluid operable second section slidably received by said first section;

a winch assembly including a base assembly and a pair of cables, each cable of said pair of cables extending from said base assembly about free ends of respective said second sections, each said cable having a securing mechanism at a free end thereof opposite said base assembly for securing a load; and a control system in operative communication with said first boom, said second boom and said winch assembly, said control system configured to independently activate each said second section to extend from and retract to its corresponding said first section, to pivotally position each of said first boom and said second boom with respect to said chassis, and to activate said winch assembly to retract and extend said cables about said free ends of said respective second sections, to thereby manipulate a single load with both said booms.

16. The crane truck as in claim 15, wherein said first boom and said second boom are independently pivotable in their respective said parallel vertical planes.

17. The crane truck as in claim 15, wherein said first section of said first boom and said first section of said second boom are attached in parallel to each other on opposite sides of a substantially vertical plane so that said first boom and said second boom are maintained parallel to each other.

18. The crane truck as in claim 15, wherein said first section of said first boom is attached parallel to and above said first section of said second boom so that said first boom and said second boom are maintained parallel to each other.

19. The crane truck as in claim 15, wherein said first boom first section and said second boom first section are commonly mounted to said boom support assembly by a horizontal pin extending through both said first sections.

20. A crane truck for hoisting, holding and/or towing heavy loads, said crane truck comprising:

a mobile chassis;

a boom support assembly mounted to said chassis;

a first boom and a second boom having respective first sections pivotally mounted to said boom support assembly so that said first boom and said second boom are pivotal in parallel vertical planes, each of said first boom and said second boom also having a fluid operable second section slidably received by said first section;

a winch assembly including a base assembly and a pair of cables, each cable of said pair of cables extending from said base assembly about free ends of respective said second sections, each said cable having a securing mechanism at a free end thereof opposite said base assembly for securing a load; and means for independently activating each said second section to extend from and retract to its corresponding said first section, for pivotally positioning each of said first boom and said second boom with respect to said chassis, and for activating said winch assembly to retract and extend said cables about said free ends of said respective second sections, to thereby manipulate a single load with both said booms.

21. The crane truck as in claim 1, wherein said first boom and said second boom are mounted on said boom support assembly so that they are maintained in said parallel vertical planes.

* * * * *